Dec. 22, 1936.   D. L. BLAKE   2,065,361
SAND SPREADING DEVICE
Filed Jan. 16, 1936
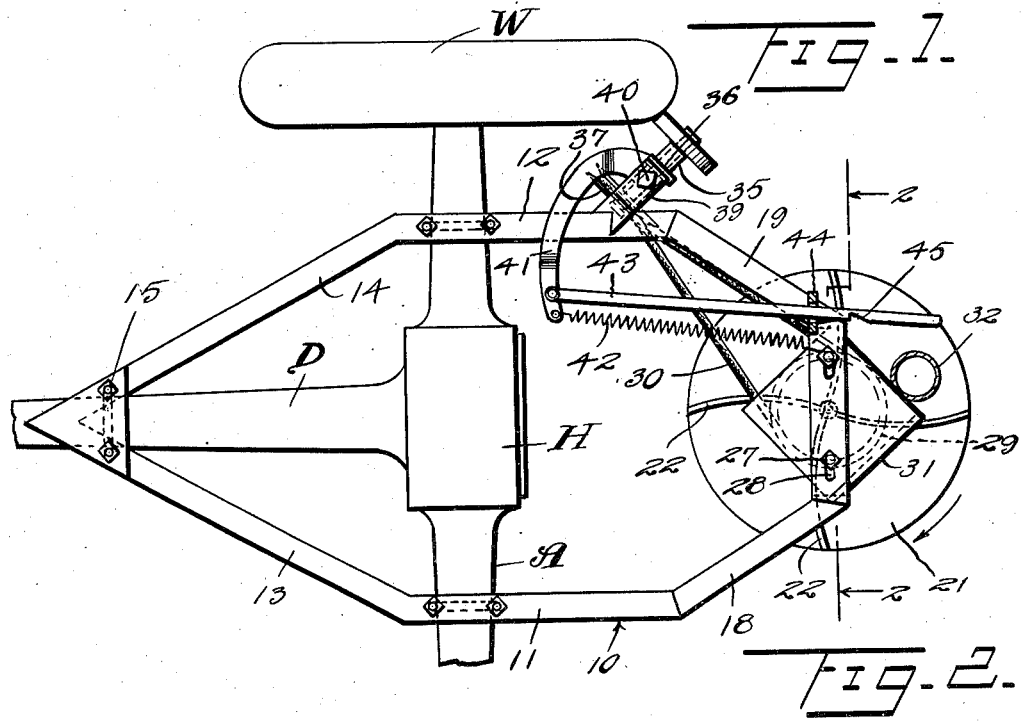
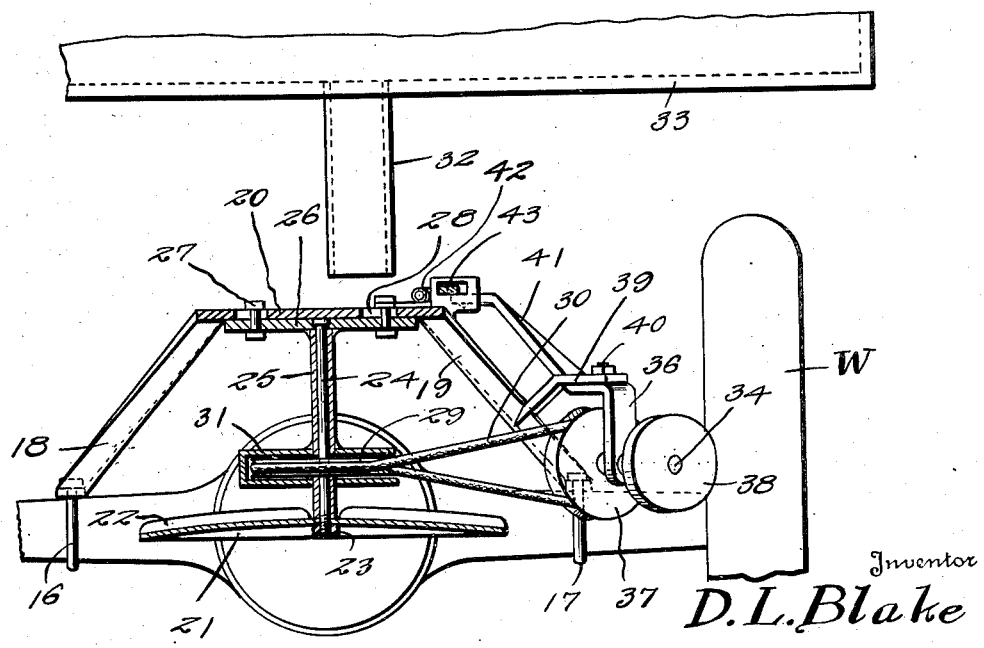
Inventor
D. L. Blake
By Watson E. Coleman
Attorney Patented Dec. 22, 1936

2,065,361

UNITED STATES PATENT OFFICE 2,065,361

SAND SPREADING DEVICE

Dan L. Blake, Wenatchee, Wash.

Application January 16, 1936, Serial No. 59,451

4 Claims. (Cl. 275—8)

This invention relates to a material broadcasting and distributing device and more particularly to a device which may be attached to a vehicle for distributing sand or other granular or relatively fine material.

An object of this invention is to provide a material distributing means which can be readily attached to a motor vehicle beneath the body thereof in a manner whereby the power for distributing the material is received through the movement of the vehicle.

Another object of this invention is to provide an improved manner of applying power to a distributing device of this kind so that the device may be clamped to the frame or under-carriage of a vehicle and may be operated at will so as to distribute or broadcast sand or other loose material at the rear of the vehicle.

A further object of this invention is to provide an improved means for securing a broadcasting or distributing device of this character beneath the body of a vehicle so that the material to be broadcast may be carried in the vehicle and dropped onto the distributor or broadcaster, the attaching means being of such a character as to not interfere with the present parts of the vehicle and render it unnecessary to change such parts.

The above and various other objects and advantages of this invention will in part be described in, and in part be understood from the following detail description of the present preferred embodiment, the same being illustrated in the accompanying drawing, wherein:—

Figure 1 is a fragmentary top plan of the under-carriage of a vehicle having a device constructed according to an embodiment of this invention mounted thereon.

Figure 2 is a sectional view partly in detail taken on the line 2—2 of Figure 1, the body of the vehicle being shown in fragmentary rear elevation.

Referring to the drawing wherein like symbols designate corresponding parts throughout the several views, the letter A designates generally the axle housing for the rear axle of a motor vehicle having wheels W associated with each end and the letter D indicates generally a drive shaft housing which is connected to a central housing H which encloses the usual differential gears. This construction is conventional and is here shown in only diagrammatic form, it being understood that the hereinafter described broadcasting or distributing means may be attached to any conventional under-carriage of a vehicle.

A frame, generally designated as 10, is secured to the axle housing A and the drive shaft housing D and comprises side bars 11 and 12 disposed in substantially parallel relation which are extended forwardly, as at 13 and 14 in convergent relation. The extensions 13 and 14 are connected together at substantially the center of the housing D and may be clamped, as by a U-shaped clamping means 15, to the drive shaft housing D forwardly of the differential housing H. The two side bars 11 and 12 may be clamped to the axle housing A on opposite sides of the differential H by means of U-shaped clamping members 16 and 17 respectively. The frame members 11, 12, 13, and 14 are disposed in substantially horizontal position and the rear ends of the frame members 11 and 12 are provided with upwardly and rearwardly inclined extensions 18 and 19 respectively, which are disposed in rearwardly convergent relation and connected together by means of a connecting bar 20. This connecting bar 20 is disposed in upwardly and rearwardly offset relation to the differential housing and forms a support for the distributor.

A substantially disc-like distributor or broadcasting member 21, having blades or veins 22 on the upper surface thereof, is secured as by a nut 23 to a shaft 24 rotatably mounted in a tubular housing 25. The housing 25 is secured to a bar 26 and this bar 26 is fastened to the underside of the supporting member 20 by means of a pair of bolts or fastening members 27. Preferably, the supporting bar 20 is provided with a pair of elongated slots 28 through which the bolts 27 pass so that the shaft 24 with the bearing 25 and the plate 26 may be shifted laterally to place the desired tension on the operating belt hereinafter described.

A driven pulley 29 is secured to the shaft 24 above the broadcasting member 21 and is provided with a peripheral groove in which a driving belt 30 engages. Preferably, a shield or housing 31 is disposed about the pulley 29 so that when sand or other granular material is dropped onto the distributing member 21 from a nozzle or pipe 32 carried by the body 33 of the vehicle, this sand will not contact with the pulley 29.

The distributor or broadcasting member 21 is operated by means of a power member comprising a drive shaft 34 which is rotatably carried by a bearing 35 and this bearing 35 is supported in dependent relation from an arm 36. The drive shaft 34 has a driving pulley 37 secured thereto which is provided with a peripheral groove and the driving belt 30 engages in the groove of this pulley 37. A frictional drive member or wheel 38 is secured to the shaft 34 and is adapted to frictionally engage the wheel W, preferably at one side of the wheel, so that as this wheel W turns under the movement of the vehicle, the driving wheel or pulley 38 will be turned.

The dependent arm 36 is supported from a bracket 39 which is secured to the frame extension 19, the dependent arm being mounted on a pivotal member 40. An operating lever 41 is secured to or integral with the hanger 36 and extends inwardly and upwardly of the frame 10, as shown in Figure 1. The free end of the lever 41 has a contractile spring 42 secured thereto and this spring 42 is also secured to one of the bolts 27 and constantly urges the driving member 38 into frictional engagement with the inner side of the wheel W. A releasing lever or rod 43 is secured at one end to the lever 41 and loosely extends through a guide 44 carried by the frame 10 adjacent the rear thereof.

The rod 43 has a notch 45 in one side thereof which is adapted to engage in the guide or keeper 44 so as to hold the lever 41 in released position and thus maintain the frictional wheel 38 out of engagement with the tire of the wheel W.

In the use and operation of this device, the desired material in the form of sand or the like may be placed in the body 33 and, if desired, a suitable valve or controlling means may be provided so as to control the quantity of sand passing downwardly through the outlet pipe or nozzle 32. Assuming that the vehicle is moving forwardly and that the frame 10 is secured to the rear portion of the under-carriage of the body, the sand from the nozzle 32 will drop onto the surface of the distributing member 21. This member 21 is set in motion by releasing the holding member 43 and permitting the spring 42 to swing the lever 41 to maintain the driving member 38 in frictional contact with the side of the tire on the wheel W. It will, of course, be understood that while the frame 10 is shown attached to the rear of the vehicle, the frame may, if desired, be attached to the front of the vehicle without undue modification of the structure and in this case the wheel 38 will engage one of the front wheels of the vehicle.

The driving belt 30 may be adjusted as to tension by shifting the bolts 27 in the slots 28 of the supporting bar 26 so that when the device is in operative position, the distributing member 21 will be rotated without any looseness in the belt 30. After the desired distribution of sand has been made, the device can be swung to an inoperative position by pushing the rod 43 forwardly until the notch 45 engages the keeper 44 and thus holds the shaft 34 and wheel 38 out of engagement with wheel W against the tension of the spring 42.

I claim:—

1. A material distributing means for a vehicle comprising a frame, means for securing the frame to the under-carriage of the vehicle, a horizontally rotatable distributing member, means for rotatably supporting the distributing member from the frame, a driving member adapted to frictionally engage a side of a wheel associated with the vehicle, mounting means for said driving member, means for connecting the driving member with the distributing member, means for swingably supporting the mounting means from the frame, yieldable means for maintaining the driving member in frictional contact with a wheel, and means for holding the driving member in released position against the tension of the yieldable means, said latter means comprising a keeper secured to the frame and a notched rod carried by the mounting means.

2. A material distributing means for a vehicle comprising a frame, means for securing the frame to the vehicle, a horizontally rotatable distributing member, means for supporting the distributing member from the frame, a driven wheel rotatable with the distributing member, a power member, mounting means for the power member, means for swingably securing the mounting means to the frame, a belt connecting the power member with the driven wheel, yieldable means constantly urging the power means into frictional contact with a side of a wheel associated with the vehicle, and means for maintaining the power means in released position against the tension of said yieldable means, said latter means comprising a keeper secured to the frame and a notched rod carried by the mounting means.

3. A material distributing means for a vehicle comprising a frame, means for securing the frame to the vehicle, a horizontally rotatable distributing member, a shaft secured to the distributing member, bearing means carried by the frame for rotatably supporting the shaft in a vertical position, a driven pulley secured to the shaft, a shield about said pulley, a drive shaft, a driving member secured to said drive shaft and adapted to frictionally engage a side of a wheel associated with the vehicle, bearing means for said drive shaft, means for swingably securing said bearing means to the frame, a lever secured to said bearing securing means, a spring engaging said lever and constantly urging said driving member into frictional engagement with a side of a wheel and releasable holding means engaging said lever for maintaining the driving member in released position.

4. A material distributing means for a vehicle comprising a frame, means for securing the frame to the under-carriage of a vehicle, a horizontally rotatable distributing member, a driven shaft secured to the distributing member, a bearing for said driven shaft, means for adjustably securing said bearing to the frame whereby said bearing may be adjusted laterally with respect to the vehicle, a drive shaft, a bearing for said drive shaft, a driving member carried by said drive shaft, means for connecting said drive shaft with the driven pulley, means for swingably securing said drive shaft bearing to the frame, a lever secured to the drive shaft bearing and extending inwardly of the frame, a spring secured to the lever and to the frame and constantly urging the driving member into frictional engagement with a side of a wheel associated with the vehicle, an elongated notched holding rod secured to the lever and a keeper carried by the frame and engageable with a notch of said rod to maintain the driving member in released position.

DAN L. BLAKE.